US008082194B2

(12) United States Patent
Voorhees

(10) Patent No.: US 8,082,194 B2
(45) Date of Patent: Dec. 20, 2011

(54) SYSTEMS AND PROCESSES FOR DETERMINING COSTS ASSOCIATED WITH INTERNAL SOFTWARE DEVELOPMENT

(75) Inventor: Dorothy A. Voorhees, West Bloomfield, MI (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1223 days.

(21) Appl. No.: 11/694,734

(22) Filed: Mar. 30, 2007

(65) Prior Publication Data
US 2008/0243723 A1   Oct. 2, 2008

(51) Int. Cl.
*G07B 17/00*   (2006.01)
(52) U.S. Cl. ................... 705/30; 703/32; 703/35
(58) Field of Classification Search .................. None
See application file for complete search history.

(56) References Cited

U.S. PATENT DOCUMENTS

| 6,606,744 B1* | 8/2003 | Mikurak ........................ 717/174 |
| 2005/0119922 A1* | 6/2005 | Eder ................................ 705/7 |

OTHER PUBLICATIONS

"Intermediate Accounting", tenth edition, Kieso, Donald; Weygandt, Jerry J.; Warfield, Terry, 2001, pp. 599-630.*
"Capitalization of Software development costs: A survey of Accounting Practices in the Software Industry", Mulford, Dr. Charles W., Roberts, Jack, Georgia Tech, College of Management; Georgia Tech Financial Anlaysis Lab, May 2006.*
"Statement of Position 98-1 Accounting for the Costs of Computer Software Developed or Obtained for Internal Use" (SOP 98-1), Mar. 1998.*

* cited by examiner

*Primary Examiner* — M. Thein

(57) ABSTRACT

Systems and processes may receive and analyze billing information and/or business expenditures to determine costs associated with jobs corresponding to an internal development of software for internal use. The billing information and/or business expenditures may be analyzed according to accounting rules. Capitalizable costs and/or expenses may be determined based on business information and/or business expenses.

20 Claims, 17 Drawing Sheets

TO/FROM FIG. 4B →

| | IT Network Activity | Task Name | SAP WBSE Americas |
|---|---|---|---|
| 0 | 0 | ⊟ DAV MYP_CSS_01_001 Enterprise Data Model | |
| 1 | 0 | ⊟ Work Management | |
| 2 | 0 | ⊟ Plan Project  ╱—405 | |
| 3 | 0 | ⊟ Plan Project Work - Summary | |
| 4 | 40 | 410  Start Project | K-000000-1390-001200-PLN |
| 5 | 40 | Refine Scope and Approach | K-000000-1390-001200-PLN |
| 6 | 40 | 420 — Define Project Process | K-000000-1390-001200-PLN |
| 7 | 40 | Define Quantitative Mangement Components | K-000000-1390-001200-PLN |
| 8 | 40 | Prepare Plan Components | K-000000-1390-001200-PLN |
| 9 | 40 | Estimate Project Work | K-000000-1390-001200-PLN |
| 10 | 40 | Create Project Schedule | K-000000-1390-001200-PLN |
| 11 | 40 | Package and Secure Commitment | K-000000-1390-001200-PLN |
| 12 | 40 | Plan Project Works - Review | K-000000-1390-001200-PLN |
| 13 | 40 | Plan Project Works - Rework | K-000000-1390-001200-PLN |
| 14 | 40 | Project Plan Completed | K-000000-1390-001200-PLN |
| 15 | 0 | ⊟ Execute Project Plan —— 405 | |
| 16 | 0 | ⊟ Execute Project Plan - Summary | |
| 17 | 40 | Deploy Project Resources | K-000000-1390-001200-PLN |
| 18 | 40 | ⊟ Manage Plan Execution | K-000000-1390-001200-PLN |
| | 0 | Adams Ray – giw35k | |
| | 0 | 450 — Lopez Alfonso – pzxm31 — 455 | |
| | 0 | Pate Glen – hzz0tk | 430 |
| | 0 | Charles Roberta – wi2r14 | |
| 19 | 40 | 420 — ⊟ Manage Project Results | K-000000-1390-001200-PLN |
| | 0 | 450 — Adams Ray – giw35k — 455 | |
| | 0 | Lopez Alfonso – pzxm31 | |
| | 0 | Pate Glen – hzz0tk | |
| | 0 | Charles Roberta – wi2r14 | |

*Fig. 4A*

← TO/FROM FIG. 4A

| Details | March | | | | | April | |
|---|---|---|---|---|---|---|---|
| | 20-02 | 27-02 | 06-03 | 13-03 | 20-03 | 27-03 | |
| Act.W | 823.08h | 794.5h | 770.25h | 780.25h | 689h | 87h | |
| Act.W | 35h | 0h | 60h | 31h | 5h | | |
| Act.W | | | | | | | |
| Act.W | | | | | | | |
| Act.W | | | | | | | |
| Act.W | | | | | | | |
| Act.W | | | | | | | |
| Act.W | | | | | | | |
| Act.W | | | | | | | |
| Act.W | | | | | | | |
| Act.W | | | | | | | |
| Act.W | | | | | | | |
| Act.W | | | | | | | |
| Act.W | 440 | | | | | | |
| Act.W | | | | | | | |
| Act.W | 4h | 0h | 0h | 0h | 0h | | |
| Act.W | 4h | 0h | 0h | 0h | 0h | | |
| Act.W | | | | | | | |
| Act.W | 4h | 0h | 0h | 0h | 0h | | |
| Act.W | | | | | | | |
| Act.W | | 440 | | | | | |
| Act.W | | | | | | | |
| Act.W | 4h | 0h | 0h | 0h | 0h | | |
| Act.W | | | | | | | |
| Act.W | | | | | | | |
| Act.W | | | | | | | |
| Act.W | | | | | | | |

*Fig. 4B*

TO/FROM FIG. 5B →

| | File | Edit | View | Insert | Format | Tools | Project | Collaborate | Window |

| | A1 | | Project | |
|---|---|---|---|---|
| | A | B | C | D |
| 1 | Project | Sub Project | Resource Name | KNumber |
| 2 | CSS | EDM | Adams Ray - gzw35k | K-000000-1390-0012 |
| 3 | CSS | EDM | Adams Tod - bcqngf | K-000000-1390-0014 |
| 4 | CSS | EDM | Arnold Kevin - rzssfm | K-000000-1390-0012 |
| 5 | CSS | EDM | Arnold Kevin - rzssfm | K-000000-1390-0012 |
| 6 | CSS | EDM | Arnold Kevin - rzssfm | K-000000-1390-0013 |
| 7 | CSS | EDM | Arnold Kevin - rzssfm | K-000000-1390-0012 |
| 8 | CSS | EDM | Batzer Steve -- bz012q | K-000000-1390-0012 |
| 9 | CSS | EDM | Batzer Steve -- bz012q | K-000000-1390-0013 |
| 10 | CSS | EDM | Batzer Steve -- bz012q | K-000000-1390-0013 |
| 11 | CSS | EDM | Batzer Steve -- bz012q | K-000000-1390-0012 |
| 12 | CSS | EDM | Batzer Steve -- bz012q | K-000000-1390-0023 |
| 13 | CSS | EDM 520 | Blassinggame Mark -- g27ltq | K-000000-1390-0014 |
| 14 | CSS | EDM | Blassinggame Mark -- g27ltq | K-000000-1390-0014 |
| 15 | CSS | EDM | Buchmiller Jeff -- rz2280 | K-000000-1390-0012 |
| 16 | CSS | EDM | Buchmiller Jeff -- rz2280 | K-000000-1390-0012 |
| 17 | CSS | EDM | Carr Clinton -- mz9dxx | K-000000-1390-0013 |
| 18 | CSS | EDM | Carr Clinton -- mz9dxx | K-000000-1390-0013 |
| 19 | CSS | EDM | Carr Clinton -- mz9dxx | K-000000-1390-0013 |
| 20 | CSS | EDM | Carr Clinton -- mz9dxx | K-000000-1390-0012 |
| 21 | CSS | EDM | Carr Clinton -- mz9dxx | K-000000-1390-0022 |
| 22 | CSS | EDM | Carr Clinton -- mz9dxx | K-000000-1390-0022 |
| 23 | CSS | EDM | Carr Clinton -- mz9dxx | K-000000-1390-0013 |
| 24 | CSS | EDM | Cassels Jeff = szmbl4 | K-000000-1390-0012 |
| 25 | CSS | EDM | Connel Curt = nzw772 | K-000000-1390-0013 |
| 26 | CSS | EDM | Cuff Morgan -- xzy63t | K-000000-1390-0012 |
| 27 | CSS | EDM | Cuff Morgan -- xzy63t | K-000000-1390-0012 |
| 28 | CSS | EDM | Cuff Morgan -- xzy63t | K-000000-1390-0012 |
| 29 | CSS | EDM | Eskins Spike -- xziz12 | K-000000-1390-0012 |
| 30 | CSS | EDM | Eskins Spike -- xziz12 | K-000000-1390-0012 |
| 31 | CSS | EDM 520 | Eskins Spike -- xziz12 | K-000000-1390-0012 |
| 32 | CSS | EDM | Eskins Spike -- xziz12 | K-000000-1390-0013 |
| 33 | CSS | EDM | Eskins Spike -- xziz12 | K-000000-1390-0012 |
| 34 | CSS | EDM | Eskins Spike -- xziz12 | K-000000-1390-0013 |
| 35 | CSS | EDM | Eskins Spike -- xziz12 | K-000000-1390-0012 |
| 36 | CSS | EDM | Hebert Alan -- nzm099 | K-000000-1390-0012 |
| 37 | CSS | EDM | Hebert Alan -- nzm099 | K-000000-1390-0014 |
| 38 | CSS | EDM | Hebert Alan -- nzm099 | K-000000-1390-0012 |
| 39 | CSS | EDM | Hebert Alan -- nzm099 | K-000000-1390-0012 |
| 40 | CSS | EDM | Koss Frank -- nz3y4p | K-000000-1390-0012 |

|◄ ◄ ► ►|\ Access Upload /WBSEUpload/ResourceUpload / Instructions / Da

Ready

← TO/FROM FIG. 5A

| E | F | G | H | I | J |
|---|---|---|---|---|---|
| Task | Week1 | Week2 | Week3 | Week4 | Week5 |
| Architecture Services | 89 | 65 | 64 | 70 | 0 |
| Migrate solution to PROD | 36 | 41.5 | 0 | 0 | 0 |
| Attend Team Meetings | 2 | 2 | 0 | 2 | 0 |
| EDM Develop Data Standards and Policies | 13 | 18 | 22 | 21 | 0 |
| EDM GM – Logical Design | 4 | 11 | 0 | 0 | 0 |
| EDM GM – Analysis | 0 | 8 | 2 | 11 | 0 |
| Attend Team Meetings | 2 | 0 | 2 | 2 | 0 |
| EDM Econ Framework V0 Model Design | 0 | 0 | 3 | 0 | 0 |
| EDM GM – Logical Design | 30 | 0 | 0 | 0 | 0 |
| EDM Release Planning | 8 | 0 | 2 | 38 | 0 |
| R5 – ADH Logical Data Model Design | 0 | 0 | 32 | 0 | 0 |
| Install MO/Prod Oracle Products | 0 | 42 | 0 | 0 | 0 |
| Migrate Solution to PROD —510 | 40 | 0 | 0 | 0 | 0 |
| Party Hub Release 1 go live | 32 | 0 | 0 | 0 | 0 |
| Project-related Training | 510 0 | 0 | 12 | 0 | 0 |
| Asset – Technical Design Data Access | 0 | 0 | 25 | 20 | 0 |
| Create Hub Technical Architecture Document | 0 | 0 | 6 | 2 | 0 |
| Determine Message Schema —510 | 13 | 0 | 0 | 0 | 0 |
| Party Hub Release 1 go live | 20 | 0 | 0 | 0 | 0 |
| R5-ADH Asset (Install Base) Requirement Gathering | 0 | 0 | 9 | 0 | 0 |
| R5-ADH EDS Team Knowledge Sharing Session | 0 | 0 | 3 | 0 | 0 |
| R5-Bussiness Design / Asset | 10 | 0 | 0 | 20 | 0 |
| Party Hub Release 1 go live | 40 | 42 | 51 | 0 | 0 |
| MDM Infrastructure Design —510 | 0 | 61 | 61 | 55 | 0 |
| Attend Team Meetings | 5 | 0 | 0 | 0 | 0 |
| Party Hub Release 1 go live | 35 | 24 | 26 | 24 | 0 |
| Project-related Training | 0 | 16 | 0 | 0 | 0 |
| Attend Team Meetings | 5 | 6 | 3 | 3 | 0 |
| EDM Communication | 35 | 0 | 0 | 0 | 0 |
| EDM DPW - Analysis | 0 | 0 | 0 | 37 | 0 |
| EDM GM – Logical Design | 0 | 3 | 0 | 0 | 0 |
| EDM GM – Analysis | | 6 | 37 | 0 | 0 |
| EDM SM Logical Design | 0 | 3 | 0 | 0 | 0 |
| Project-related Training | 0 | 22 | 0 | 0 | 0 |
| Attend Team Meetings | 7.7 | 2 | 0 | 0 | 0 |
| Integrated Testing —510 | 9 | 0 | 0 | 0 | 0 |
| Party Hub Release 1 go live | 34.5 | 48 | 52 | 0 | 0 |
| Project-related Training | 0 | 2 | 0 | 0 | 0 |
| Asset – Operational Support and Transition | 8.5 | 0 | 0 | 0 | 0 | ta/WBSEs for Running Project

| Project | Resource Name | Contractor | Cap Hours | Cap Dollars | Non Cap Hours | Non Cap Dollars | Rate |
|---|---|---|---|---|---|---|---|
| SDA | Bernet Peggy -- SZYM8D | ☐ | 28 | 1,101.14 | 0 | $0.00 | $39.33 |
| SDA | Bhalerao Reena - fzcbvq | ☐ | 53.5 | $2,313.30 | 0 | $0.00 | $43.24 |
| SDA | Biangco Bill - xzhzyx | ☐ | 152 | $9,785.68 | 0 | $0.00 | $64.38 |
| SDA | Bishop David -- dz719d | ☐ | 71 | $4,570.94 | 81 | $5,214.74 | $64.38 |
| SDA | Bishop Jim – dzydw5 | ☐ | 1.63 | $67.11 | 0 | $0.00 | $41.17 |
| SDA | Blais Brigitte – dz86bn | ☐ | 152 | $7,866.15 | 0 | $0.00 | $51.88 |
| SDA | Blaschke Dave -- vz2vc2 | ☐ | 123 | $6,381.55 | 8.9 | $461.75 | |
| SDA | Bodel Reb – fzv88y | ☐ | 40 | $2,075.30 | 0 | $0.00 | $51.88 |
| SDA | Boodt Velma sz13rb | ☐ | 22.33 | $1,136.66 | 129.67 | $6,600.59 | $50.90 |
| SDA | Bradbury Bob - dzxfft | ☐ | 0 | $0.00 | 4.5 | $289.71 | $64.38 |
| SDA | Bradley Greg – mzc181 | ☐ | 0 | $0.00 | 34 | $1,407.86 | $41.41 |
| SDA | Bradley Jim czcvjc | ☐ | 16 | $,030.07 | 0 | $0.00 | $64.38 |
| SDA | Brinkley Jeremy -- xzmsj1 | ☐ | 73 | $4,570.24 | 7 | $438.24 | $62.61 |
| SDA | Brockie Mark - gzyycx | ☐ | 17 | $1,094.45 | 21 | $1,351.97 | $64.38 |
| SDA | Brower Cheryl A -- fz1jwz | ☐ | 42.67 | $2,727.07 | 0 | $0.00 | $64.38 |
| SDA | Brown Dave -- gzv4vc | ☐ | 108.5 | $6,792.75 | 0 | $0.00 | $62.61 |
| SDA | Brown Karl -- cz9ppy | ☐ | 21 | $1,314.73 | 11.5 | $719.97 | $62.61 |
| SDA | Bull Jean 8ZSLM2 | ☐ | 0 | $0.00 | 152 | $7,886.15 | $51.88 |
| SDA | Burham Tammy cz6n1r | ☐ | 0 | $0.00 | 0.88 | $39.25 | $44.60 |
| SDA | Burrell Tim -- bzf6kw | ☐ | 26 | $1,380.02 | 94 | $4,989.29 | $53.08 |
| SDA | Campbell Grant - lzgnqn | ☐ | 143.5 | $6,983.96 | 8.5 | $532.15 | $62.61 |
| SDA | Campbell Jeremy -- bzgt47 | ☐ | 4 | $165.63 | 0 | $0.00 | $41.41 |
| SDA | Carr Clinton -- mz9ddxx | ☐ | 51.27 | $3,807.46 | 100.73 | $7,480.51 | $74.26 |
| SDA | Carter Lisa – fzqc9k | ☐ | 152 | $11,287.97 | 0 | $0.00 | $74.26 |
| SDA | Casti Bill – tz2jv5 | ☐ | 1.17 | $73.25 | 0.08 | $5.01 | $62.61 |
| SDA | Caudullo Jane - izorsx | ☐ | 35.85 | $2,161.66 | 116.15 | $7,003.54 | $60.30 |
| | | Total | 21,841.82 | $1,423,476.65 | 3,698.46 | $1,031,536.48 | |

Record ◀◀ ◀ ▶ ▶▶ of 383

[Excel Export] [Exit]

Form View

*Fig. 6*

| | A | B | C | D | E | F | G | H | I | J |
|---|---|---|---|---|---|---|---|---|---|---|
| 1 | Project | Sub Project | Resource Name | Contractor | Rate Type | Cap Hours | Cap Dollars | Non Cap Hours | Non Cap Dollars | Rate |
| 2 | CSS | EDM | Adams Ray – gzw35k | FALSE | 34300 | 0.00 | 0.00 | 184.00 | $15,256.08 | $82.91 |
| 3 | CSS | EDM | Adams Tod – bcqngf | FALSE | 34210 | 77.50 | $3,978.13 | 0.00 | $0.00 | $51.33 |
| 4 | CSS | EDM | Arnold Kevin – rzssfm | FALSE | 34210 | 15.00 | $769.96 | 101.00 | $5,184.40 | $51.33 |
| 5 | CSS | EDM | Batzer Steve – bz012q | FALSE | 34220 | 65.00 | $4,019.76 | 54.00 | $3,339.49 | $61.84 |
| 6 | CSS | EDM | Blassinggame Mark – g27tiq | FALSE | 34210 | 82.00 | $4,209.12 | 0.00 | $0.00 | $51.33 |
| 7 | CSS | EDM | Buchmiller Jeff – rz2280 | FALSE | 34220 | 0.00 | $0.00 | 46.00 | 2,844.75 | $61.84 |
| 8 | CSS | EDM | Carr Clinton – mz9dxx | FALSE | 34290 | 96.00 | $7,022.55 | 32.00 | 2,340.85 | $73.15 |
| 9 | CSS | EDM | Cassels Jeff – szmbl4 | FALSE | 34210 | 0.00 | $0.00 | 133.00 | 6,826.99 | $51.33 |
| 10 | CSS | EDM | Connel Curt – nzw772 | FALSE | 34300 | 177.00 | $14,675.68 | 0.00 | 0.00 | $82.91 |
| 11 | CSS | EDM | Cuff Morgan xzy63t | FALSE | 34760 | 0.00 | $0.00 | 132.00 | 8,575.65 | $64.97 |
| 12 | CSS | EDM | Eskins Spike – xzrz12 | FALSE | 34200 | 6.00 | $242.84 | 154.00 | 6,232.77 | $40.47 |
| 13 | CSS | EDM | Koss Frank – nz3y4p | FALSE | 34770 | 31.00 | $2,437.14 | 114.25 | 8,982.04 | $78.62 |
| 14 | CSS | EDM | Sanders Steve – mzq609 | FALSE | 34290 | 35.00 | $2,560.31 | 114.00 | 8,339.28 | $73.15 |
| 15 | CSS | EDM | Silwinski Grace – rzzif7y | FALSE | 34290 | 27.00 | $1,975.09 | 67.00 | 4,901.16 | $73.15 |
| 16 | CSS | EDM | Tinker Greg – kznz1d | FALSE | 34300 | 0.00 | $0.00 | 142.50 | 11,815.17 | $82.91 |
| 17 | CSS | EDM | Vakulenko Andrey – tzpbnm | FALSE | 34290 | 89.00 | $6,510.00 | 84.00 | 6,144.73 | $73.15 |
| 18 | CSS | EDM | Hewbert Alan – nzmf099 | TRUE | Insight Global3 | 9.00 | $666.00 | 146.00 | 10,804.00 | $74.00 |
| 19 | CSS | EDM | LaJoie Lee – nzp72p | TRUE | PCI (Pinkerton)1 | 2.00 | $150.00 | 3.25 | 243.75 | $75.00 |
| 20 | CSS | EDM | Missula Murali tzcrt9 | TRUE | Insight Global2 | 0.00 | $0.00 | 159.00 | $11,448.00 | $72.00 |
| 21 | CSS | EDM | Palansamy Murali – dzkbnm | TRUE | Oracle3 | 50.00 | $11,098.00 | 110.00 | $24,415.60 | $221.96 |
| 22 | CSS | EDM | Pandey Deepak – qzq72p | TRUE | Red River Solutions1 | 0.00 | $0.00 | 60.00 | $5,460.00 | $91.00 |
| 23 | CSS | EDM | Sriramula Neelima – nz30nc | TRUE | Insight Global1 | 0.00 | $0.00 | 167.00 | $11,523 | $69.00 |
| 24 | CSS | EDM | Watkins Don – kzf0n9 | TRUE | DA Contractor1 | 0.00 | $0.00 | 174.50 | $12,476.75 | $71.50 |

| | MSPS Calculated Data and Adjustment | | Use Temps and TIBCO Data Comparison | | | | |
|---|---|---|---|---|---|---|---|
| Rate | Total Hours | Total Dollars | Regular Hours | OT Hours | Total Hours | Invoice Amount | Hour Differences |
| $ 94.00 | 164.00 | 15,416.00 | 164.00 | – | 164.00 | 15,416.00 | Ok |
| $ 75.20 | 152.00 | 11,430.00 | 143.00 | 9.00 | 152.00 | 11,430.40 | Ok |
| $ 136.00 | 178.00 | 24,208.00 | 178.00 | – | 178.00 | 24,208.00 | Ok |
| $ 95.00 | 152.00 | 14,440.00 | 152.00 | – | 152.00 | 14,440.00 | Ok |
| $ 90.00 | 160.00 | 14,440.00 | 148.00 | 12.00 | 160.00 | 14,440.00 | Ok |
| $ 75.20 | 118.00 | 8,873.00 | 106.00 | 12.00 | 118.00 | 8,873.60 | Ok |
| $ 115.00 | 40.00 | 4,600.00 | 40.00 | – | 40.00 | 4,600.00 | Ok |
| $ 115.00 | 164.00 | 18,860.00 | 164.00 | – | 164.00 | 18,860.00 | Ok |
| $ 200.00 | 181.00 | 36,200.00 | 181.00 | – | 181.00 | 36,200.00 | Ok |
| $ 85.00 | 153.00 | 13,005.00 | 152.00 | 1.00 | 153.00 | 13,005.00 | Ok |
| $ 100.00 | 275.50 | 27,550.00 | 275.50 | – | 275.50 | 27,550.00 | Ok |
| $ 180.00 | 157.00 | 28,260.00 | 157.00 | – | 157.00 | 28,260.00 | Ok |
| $ 88.00 | 152.00 | 13,376.00 | 152.00 | – | 152.00 | 13,376.00 | Ok |
| $ 180.00 | 155.00 | 27,900.00 | 155.00 | – | 155.00 | 27,900.00 | Ok |
| $ 120.00 | 122.00 | 14,640.00 | 122.00 | – | 122.00 | 14,640.00 | Ok |
| $ 75.20 | 136.00 | 10,227.20 | 136.00 | – | 136.00 | 10,227.20 | Ok |
| $ 200.00 | 203.00 | 40,600.00 | 203.00 | – | 203.00 | 10,227.20 | Ok |
| $ 115.00 | 104.00 | 11,960.00 | 104.00 | – | 104.00 | 11,960.00 | Ok |
| $ 95.00 | 144.00 | 13,680.00 | 144.00 | – | 144.00 | 13,680.00 | Ok |
| $ 200.00 | 137.00 | 27,400.00 | 137.00 | – | 137.00 | 27,400.00 | Ok |
| $ 81.50 | 152.00 | 12,388.00 | 152.00 | – | 152.00 | 12,388.00 | Ok |
| $ 190.00 | 40.00 | 7,600.00 | 40.00 | – | 40.00 | 7,600.00 | Ok |
| | 3,239.50 | 397,014.20 | 3,205.50 | 34.00 | 3,239.50 | 397,014.20 | |
| | # | # | # | # | # | # | |
| TIBCO | 1,181.00 | 203,380.00 | 1,181.00 | – | 1,181.00 | 203,380.00 | TIBCO |
| USeTemps | 2,058.50 | 193,634.00 | 2,024.50 | 34.00 | 2,058.50 | 193,634.20 | USeTemps |
| Total | 3,239.50 | 397,014.20 | 3,205.50 | 34.00 | 3,239.50 | 397,014.20 | Total |
| | # | # | # | # | # | # | |

SYSTEMS AND PROCESSES FOR DETERMINING COSTS ASSOCIATED WITH INTERNAL SOFTWARE DEVELOPMENT

TECHNICAL FIELD

This invention relates to systems and processes for determining costs associated with software development, and more particularly to determining costs associated with the internal development of software for internal use.

BACKGROUND

Enterprises use software for a variety of business purposes (e.g., to provide services to clients and/or the enterprise itself, to perform data analysis for the enterprise, to manage assets, and/or as a commodity for sale) and may obtain software by licensing, purchasing, and/or internally developing the software. The manner in which software is acquired by the enterprise also affects its accounting treatment of the software (e.g., treated as an asset or an expense). Additionally, the intended purpose of the software (e.g., for internal use, for sale, to provide services to customers, etc.) may affect the accounting treatment of software that is obtained. Furthermore, government regulations (e.g., federal and state) may affect the accounting treatment of software that is obtained. For example, government regulations may require adherence to Generally Accepted Accounting Principles (GAAP) or other standard accounting procedures, which may be based on industry standards or government regulations.

SUMMARY

Systems and processes may receive billing information and business expenditures and determine costs for an enterprise for a time period based on the received information. The costs may be for jobs associated with internal development of software for internal use. Costs, such as capitalizable costs and expenses, may be determined by applying accounting rules to the billing information and/or the business expenditures. Systems and processes may also allow review, approval, and/or modification of billing information and/or business expenditures.

In one general aspect, billing information and business expenditures for jobs are received, at least one ratio of capitalizable costs to expenses for each of the jobs is determined, and capitalizable costs for the enterprise for a time period are determined based on the billing information, the business expenditures, and the determined ratios. The received billing information includes job identifiers for jobs and capitalizable costs for the enterprise for a time period. The capitalizable costs in the billing information are based on amounts of time billed by individuals for the jobs.

Various implementations may include one or more of the following features. Identification of business expenditure types for the received business expenditures may be received. An analysis of the received business expenditures may be performed based on accounting rules. At least one of the accounting rules may include a rule applicable to capitalizable portions of the business expenditures. Ratios of capitalizable costs to expenses for the jobs may be determined based at least in part on the individual identifiers associated with the business expenditures. Individual identifiers may include a relationship of an individual to the enterprise and/or may be associated with the received business expenses. Capitalizable costs for the enterprise for a time period may be determined based at least partially on the individual identifiers. The received billing information may include amounts of time billed to capitalizable tasks of the jobs and the ratios of capitalizable costs to expenses may be determined based in part on the amount of time billed to the capitalizable tasks. Approval of and/or modifications to the business expenses and/or the billing information may be received. Documentation related to the received modifications may be received and stored. Capitalizable costs for the enterprise for a time period may be stored. Expenses for the enterprise for the time period may be determined based on the billing information, the business expenditures, and at least one of the ratios of capitalizable costs to expenses. A report including a total capitalizable cost for a time period based on the determined capitalizable costs may be generated.

In another general aspect, billing information for jobs that include tasks is received and business expenditures for the tasks and individual identifiers for individuals who incurred the business expenses are received. The received billing information includes task identifiers for the tasks and capitalizable costs for the enterprise for a time period based on amounts of time billed for the tasks. The individual identifiers indicate a relationship of an individual to the enterprise. At least one ratio of capitalizable costs to expenses is determined for at least one of the tasks, and capitalizable costs for the enterprise for a time period are determined based on the billing information, the business expenditures, the individual identifiers, and the determined ratios.

Various implementations may include one or more of the following features. An analysis of business expenditures may be performed based on accounting rules. At least one of the accounting rules may include a rule related to capitalizable portions of the business expenditures. A ratio of capitalizable costs to expenses may be determined based on the time billed by individuals to at least one of the tasks. Approval of business expenses, modification of business expenses, and/or documentation related to the modifications may be received.

In another general aspect, capitalizable costs associated with an internal development of software for internal use by an enterprise are using a memory that stores accounting rules, an analysis module, and an expense module. The analysis module receives billing information for jobs and business expenditures associated with individuals and determines ratios of capitalizable costs to expenses for the jobs. The received billing information includes capitalizable costs for an enterprise for a time period based on amounts of time billed by individuals, and individual identifiers associated the individuals. The expense module determines capitalizable costs for the enterprise for a time period based on the billing information, the business expenditures, and the determined ratios of capitalizable costs to expenses.

Various implementations may also one or more of the following features. A rules engine may perform an analysis of received business expenditures based on one or more accounting rules. Accounting rules may include a rule applicable to an independent contractor of the enterprise. Independent contractors may be identified based on the individual identifiers.

The details of one or more implementations of the invention are set forth in the accompanying drawings and the description below. Other features will be apparent from the description and drawings, and from the claims.

DESCRIPTION OF DRAWINGS

FIG. 6 illustrates an example of a display presented by a cost analysis device.

FIG. 8 illustrates an example of billing information that includes capitalizable costs based on amounts of time billed.

FIG. 9 illustrates an example display presented for the entry of business expenditures.

FIG. 11 illustrates an example of a report.

Like reference symbols in the various drawings indicate like elements.

DETAILED DESCRIPTION

Systems and processes may determine costs associated with the internal development of software for internal use. Costs may be identified as capitalizable costs or expenses. Capitalizable costs may be capitalizable (e.g., treated as a credit on long-term asset accounts, treated as a debit on the cash account of a balance sheet, and/or amortized such that depreciation expenses are treated as expenses on an income statement) and treated as an asset of the company, as opposed to costs that are characterized as expenses (e.g., non-capitalizable costs). Thus, identification and accurate accounting of capitalizable costs may increase the profitability of an enterprise. Systems and processes may facilitate increased capture of capitalizable costs by retrieving billing information and business expenditures and automatically determining capitalizable costs. Compliance with GAAP and/or other standard accounting practices (e.g., Statement of Practice "SOP" rules and standards, such as SOP-98-1, *Accounting for the Costs of Computer Software Developed or Obtained for Internal Use*, Federal Accounting Standard Board "FASB" rules and/or standards, etc.) may be required by government regulations (e.g., federal and state laws) to receive the tax benefits associated with the treatment of capitalizable costs. Compliance with required reviews, approvals, and documentation (e.g., by government regulations or accounting rules) may also be facilitated by using the systems and processes.

Figure 1:
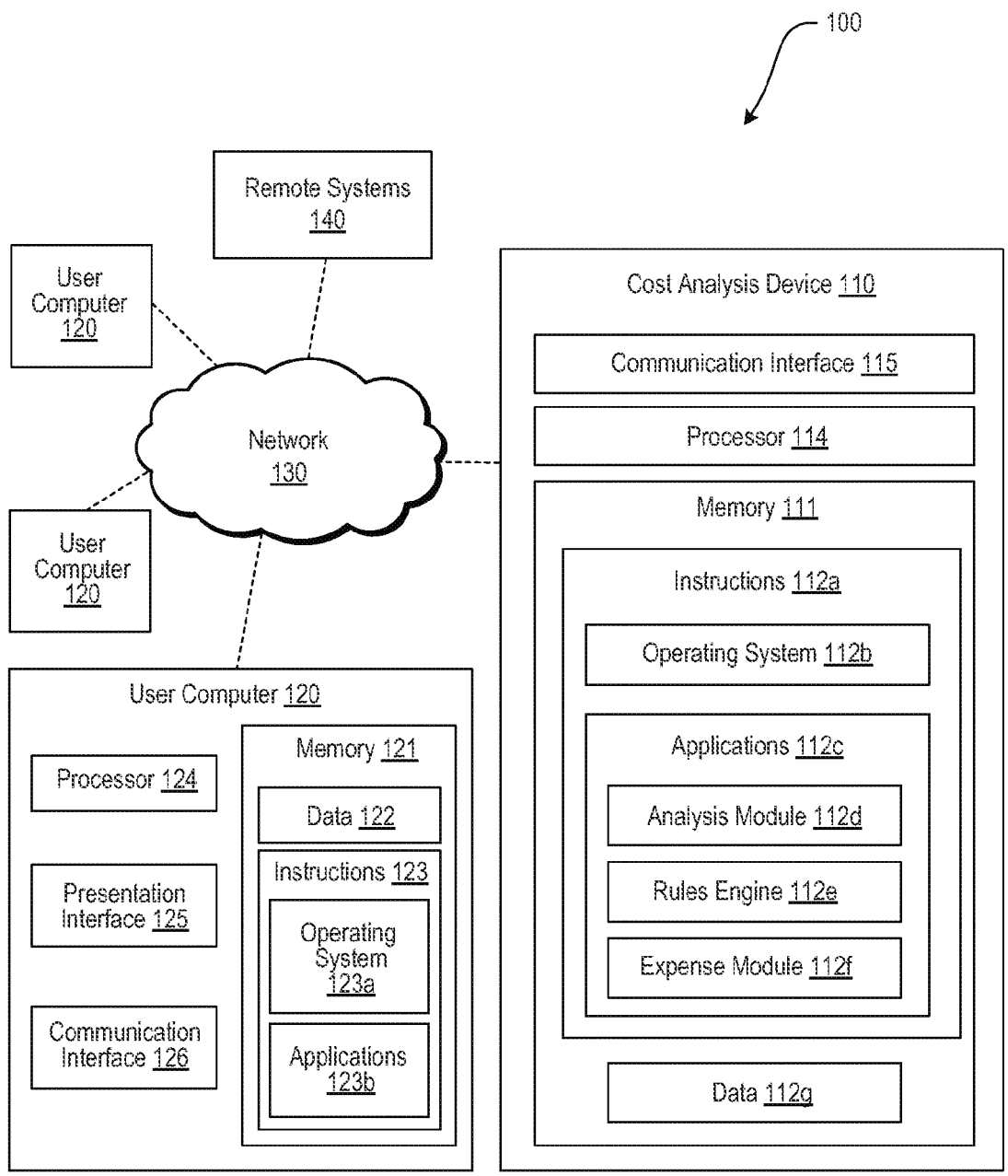
FIG. 1 illustrates an example of a system for determining costs associated with internal development of software.

FIG. 1 illustrates an example of a system for determining costs associated with the internal development of software for internal use. An enterprise (e.g., a corporation, a software development company, a service provider, etc.) may use a cost analysis device 110 to facilitate the determination of costs associated with the internal development of software for internal use. Software development often occurs over a time period (e.g., weekly, monthly, quarterly) that is longer than the time period (e.g., weekly or monthly) in which costs are billed to an enterprise and/or longer than the time period (e.g., quarterly, yearly) in which capitalizable costs may be accounted to a government, such as state or federal taxing agencies. Thus, accurate and timely capture of capitalizable costs (e.g., capture as billed rather than captured at the end of a project) may increase enterprise profitability.

Cost analysis device 100 may receive billing information and/or business expenditures and determine capitalizable costs and expenses based on the received billing information and/or the received business expenditures. Billing information may include costs for a variety of jobs (e.g., sales, software development, management, accounting, etc.). Each job may include a variety of tasks (e.g., for a job of developing new software, tasks may include, for example, creating images, coding, testing, enhancing, etc.). Since the treatment of a job, when determining capitalizable costs, may vary based on the phase of a job, a job phase may be included in billing information and/or be derived from billing information such as job identifiers (e.g., which provide information related to a job, such as a type of job, a name of job, etc.), task identifiers (e.g., which provide information related to a task, such as a type of task, a name of task, a code for a job that a task is associated with, etc.). Costs related to jobs and/or tasks associated with an internal development of software for internal use may be identified from the billing information (e.g., via job identifier, job name, task identifier, etc.). These costs may be identified since a portion of costs associated with the internal development of software for internal use may be capitalizable. Billing information may also include, for example, amounts of time billed by individuals, individual identifiers (e.g., numbers, letters, other indicia, or combinations thereof), job identifiers (e.g., numbers, letters, other indicia, or combinations thereof), task identifiers (e.g., numbers, letters, other indicia, or combinations thereof), capitalizable costs, and/or expenses. Business expenditures may include costs other than costs associated with time billed by individuals, such as, for example, travel costs (e.g., airfare, mileage reimbursements, meal costs, hotel costs, etc.), entertainment costs, and/or supply costs. Business expenditures may also include individual identifiers, job identifiers, task identifiers, capitalizable costs, ratios to determine what portion of costs are capitalizable, etc.

A cost analysis device 110 may be coupled to one or more user computers 120 via a network 130. Cost analysis device 110 may be a server or other computer system that includes a memory 111. Instructions 112a, operating systems 112b, and/or applications 112c, such as an analysis module 112d, a rules engine 112e, and/or an expense module 112f may be stored on memory 111.

Analysis module 112d may be executed by processor 114 to receive billing information and identify capitalizable costs in the billing information. For example, analysis module 112d may receive billing information (e.g., amounts of time billed and identification of individuals who billed time) for several jobs and/or tasks. Analysis module 112f may retrieve the billing information and/or a portion of the billing information such as, amounts of capitalizable costs for an enterprise for a time period (e.g., based on amounts of time billed), costs related to jobs associated with the internal development of software for internal use, individual identifiers associated with time billed, job identifiers, and/or task identifiers.

Analysis module 112d may identify billing information associated with jobs corresponding to the internal development of software for internal use. For example, analysis module 112d may identify jobs and/or tasks within billing information that are associated with the internal development of software for internal use based in part on job identifiers, job phases, and/or task identifiers. Job identifiers and/or task identifiers may include a code (e.g., letter(s), number(s), or combinations thereof) that identifies a job or a task as corresponding to internal software development for internal software use. As another example, the analysis module may apply an accounting rule to a job or a task (e.g., job information, task information, job identifiers and/or task identifiers) to determine if the job/task is associated with the internal software development of software for internal use.

Analysis module 112*d* may also identify capitalizable costs in the billing information. For example, analysis module 112*d* may analyze job identifiers or task identifiers in billing information and identify capitalizable costs based at least in part on the analysis of the job identifiers and/or the task identifiers. As another example, analysis module 112*d* may identify capitalizable costs based on accounting rules. For example, characterization of costs as capitalizable costs may be based on job type, job phase, task type, individual who incurred the expense, costs incurred to date, a ratio of capitalizable costs to expenses, and/or the type of cost (e.g., from time billed or from business expenditures). Analysis module 112*d* may operate in conjunction with rules engine 112*e* so that accounting rules are applied to the billing information to identify capitalizable costs in the billing information.

In some implementations, analysis module 112*d* may receive business expenditures (e.g., travel costs, dining costs, entertainment costs, etc.) for a job and determine a ratio of capitalizable costs to expenses for the job. The ratio of capitalizable costs to expenses may be determined based at least in part on accounting rules, capitalizable costs and/or expenses for a time period for a job or a task, capitalizable costs and/or expenses incurred to date for a job or a task, job phase, job identifiers, and/or task identifiers. For example, accounting rules may include a rule related to capitalizable costs (e.g., a maximum amount, what portion can be appropriately characterized as capitalizable, etc.). As another example, the analysis module 112*d* may determine a ratio of capitalizable costs to expenses by identifying tasks that are capitalizable tasks (e.g., tasks in which at least a portion of costs can be capitalizable) within a job (e.g., the ratio is a ratio of capitalizable tasks to non-capitalizable tasks in a job, the ratio is a ratio of time billed for a task that is capitalizable to time billed for a task that is non-capitalizable for a time period, etc.).

Rules engine 112*e* may be executed by processor 114 to analyze the billing information received. Rules engine 112*e* may analyze billing information by applying accounting rules to the billing information. For example, accounting rules, such as rules applicable to employees of the enterprise, independent contractors, job phases, capitalizable jobs, capitalizable costs, and/or expenses may be applied by the rules engine. Rules engine 112*e* may modify the billing information based on the analysis of billing information (e.g., application of accounting rules). For example, if an accounting rule allows a maximum of 40 hours per week per employee to be characterized as a capitalizable cost, the billing information may be modified to include only 40 hours per week per employee and/or capitalizable costs may only be based on 40 hours per week per employee. As another example, accounting rules may include a rule related to independent contractors, such as a rule related to capitalizable costs that are incurred by independent contractors (e.g., travel costs are capitalizable costs for independent contractors).

Expense module 112*f* may be executed by processor 114 to determine costs, such as capitalizable costs and/or expenses, for the enterprise. Capitalizable costs and/or expenses may be determined by the expense module 112*f* for a time period (e.g., a month, a quarter, a year, etc.). Expense module 112*f* may retrieve billing rates (e.g., from memory 111) and determine capitalizable costs and/or expenses based at least in part on the billing rates. Expense module may also determine capitalizable costs and/or expenses based at least in part on the analyses performed by the analysis module 112*d* and/or operations performed rules engine 112*e*.

A determined ratio of capitalizable costs to expenses (e.g., determined by analysis module 112*d*) may be used by expense module 112*f* to determine the portion (e.g., 100%, 73%, 20%, 0%, etc.) of business expenditures that can be characterized as capitalizable costs and/or expenses. Expense module 112*f* may also determine total capitalizable costs and/or expenses based on billing information and/or the business expenditures.

Memory 111 may also store data 112*g*, such as billing information, individual identifiers, information related to individuals, information related to tasks and/or jobs, business expenditures, information related to types of business expenditures, job identifiers, billing rate information, and/or accounting rules.

Cost analysis device 110 also includes a processor 114 to execute software instructions 112*a* (e.g., analysis module 112*d*, rules engine 112*e*, and/or expense module 112*f*), save data, and/or retrieve data 112*h*. Cost analysis device 110 also includes a communication interface 115. Communication interface 115 facilitates data transfer between cost analysis device 110 and user computers 120 and/or remote systems 140 via network 130. For example, communication interface 115 may facilitate retrieval of and/or receive billing information and/or business expenditures from remote systems 140 (e.g., databases, web servers, or other computer systems) via network 130. As another example, information such as accounting rules, billing rates, individual identifiers, and/or job identifiers stored on remote systems 140 may be retrieved by cost analysis device 110 using communication interface 115.

Via user computer 120, a user (e.g., individual who bills time, managers, and/or members of finance department for an enterprise) may access cost analysis device 110 (e.g., via website or other network protocols). User computer 120 may be a personal computer, a laptop, a personal digital assistant (PDA), a smart phone, or other suitable computer. As illustrated in FIG. 1, user computer 120 may include a memory 121 to store data 122 and instructions 123 (e.g., software), such as operating systems 123*a* and applications 123*b*. User computer 120 also includes a processor 124 to execute instructions, access data 122, and/or manipulate data. User computer 120 also may include presentation interface 125 to present, for example, a display (e.g., an interface presented to a user) generated by cost analysis device 110. Presentation interface 125 may allow a user to view data (e.g., billing information, business expenses, capitalizable costs, expenses, etc.) presented by cost analysis device 110. User computer 120 also includes a communication interface 126 to facilitate communication and transfer of data between the user computer and other systems (e.g., remote systems 140, cost analysis device 110) via network 130.

Figure 2:
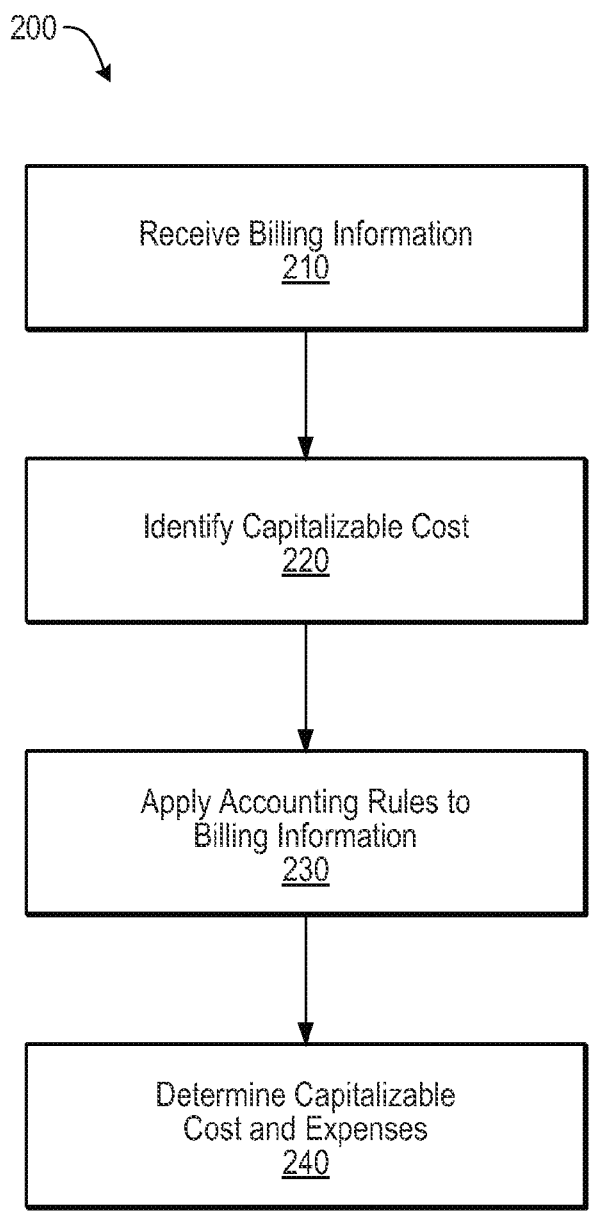
FIG. 2 illustrates an example of a process for determining costs associated with internal software development.

FIG. 2 illustrates an example process 200 for determining costs associated with the internal development of software for internal use, which may be performed by systems such as system 100 depicted in FIG. 1. Billing information is received (operation 210). Billing information may include job identifiers, task identifiers, amounts of time billed by individuals for jobs/tasks, billing rates, and/or individual identifiers. Billing information may be received via XML messages, retrieved from a database, and/or uploaded from another application, for example. Billing information may also be uploaded to a website coupled to the cost analysis device.

Capitalizable costs in the billing information may be identified (operation 220). For example, job identifiers and/or task identifiers may be used to identify capitalizable costs in the billing information. As another example, a phase of a job may be identified (e.g., based on task identifiers, job identifiers, and/or accounting rules) and capitalizable costs may be identified based on the phase of the job.

Accounting rules may be applied to billing information (operation 230). Accounting rules may be applied to the portion of the billing information in which capitalizable costs are identified. For example, accounting rules may be based on: GAAP rules and/or standards; SOP rules and standards, such as SOP-98-1, *Accounting for the Costs of Computer Software Developed or Obtained for Internal Use*; and/or FASB rules and/or standards. Accounting rules may, for example, be rules related to capital costs, expenses, tasks, jobs, individuals, billing rates, and/or amounts of time billed. Application of accounting rules may, for example, facilitate identification of capital costs, expenses, capitalizable jobs, jobs for internal development of software for internal use, capitalizable tasks, and/or individuals with a predetermined relationship to the enterprise.

Accounting rules may be retrieved from a memory coupled to the cost analysis device. Storing accounting rules in a memory coupled to the cost analysis device may facilitate updating the accounting rules. Maintaining up-to-date accounting rules may facilitate compliance with government regulations and/or increase accuracy of capitalizable cost tracking and determination.

Capitalizable costs and expenses may be determined (operation 240). For example, capitalizable costs and expenses for the received billing information may be determined based on the identified capitalizable costs and/or the application of accounting rules to the business rules.

Figure 3:
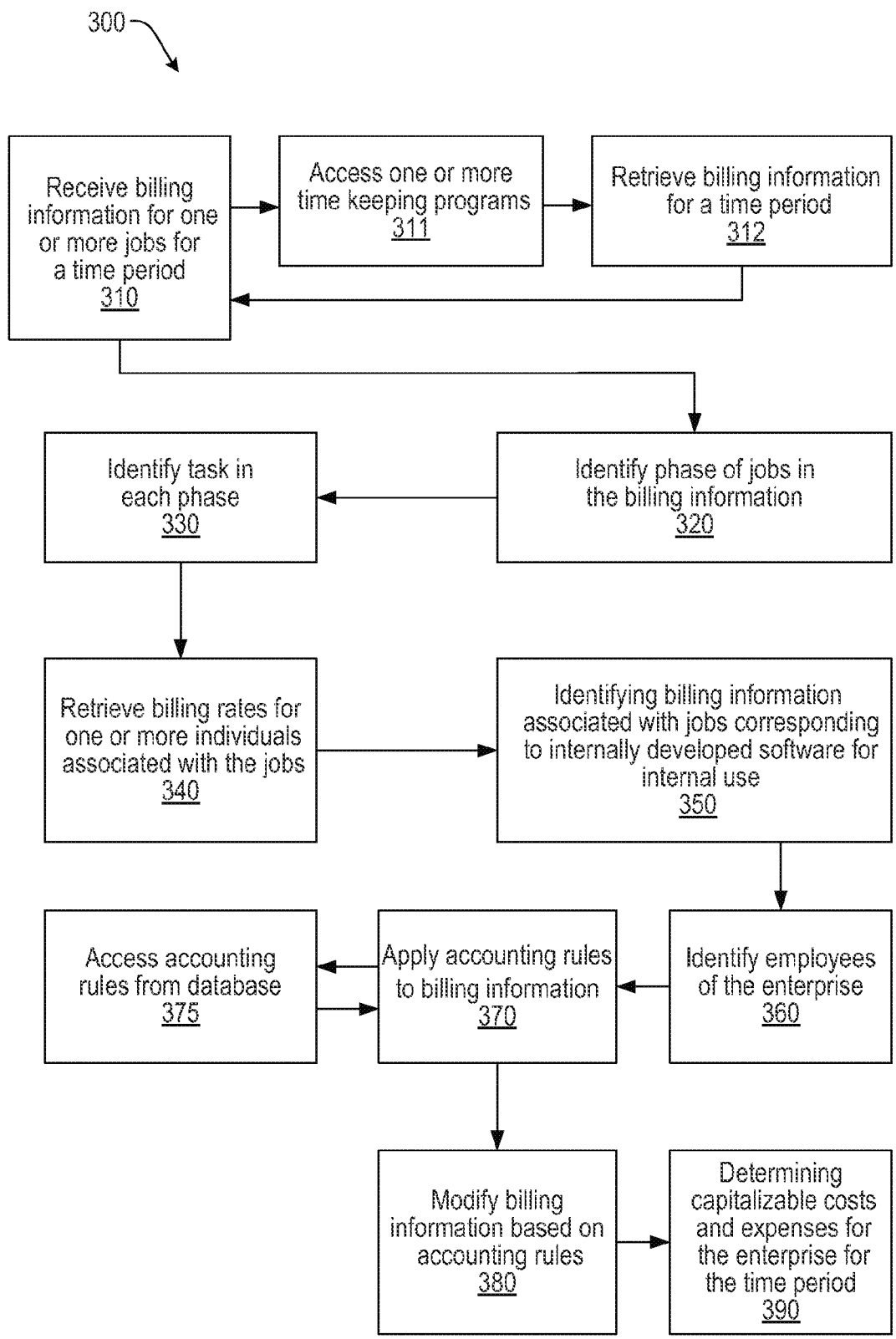
FIG. 3 illustrates an example display for determining costs associated with internal software development.

FIG. 3 illustrates an example of a process 300 for determining costs for the internal development of software for internal use performed by systems, such as system 100 depicted in FIG. 1. Billing information for a time period may be received (operation 3 10). Billing information may be related to amounts of time billed by individuals (e.g., in time keeping programs) for one or more jobs and/or tasks. Billing information may be received from one or more time keeping or billing programs (operation 311). A cost analysis device may be able to similarly process billing information from multiple time keeping programs by storing data correlating alternatives for information needed to determine capitalizable costs and/or expenses. For example, individual names, job names, and/or billing codes may be used in some time keeping programs instead of individual identifiers, job identifiers, and/or billing rates, respectively. A memory of the system may store data that correlates and/or provides alternatives to the received information, such as individual identifiers, job identifiers, and/or billing rates.

Figure 4:
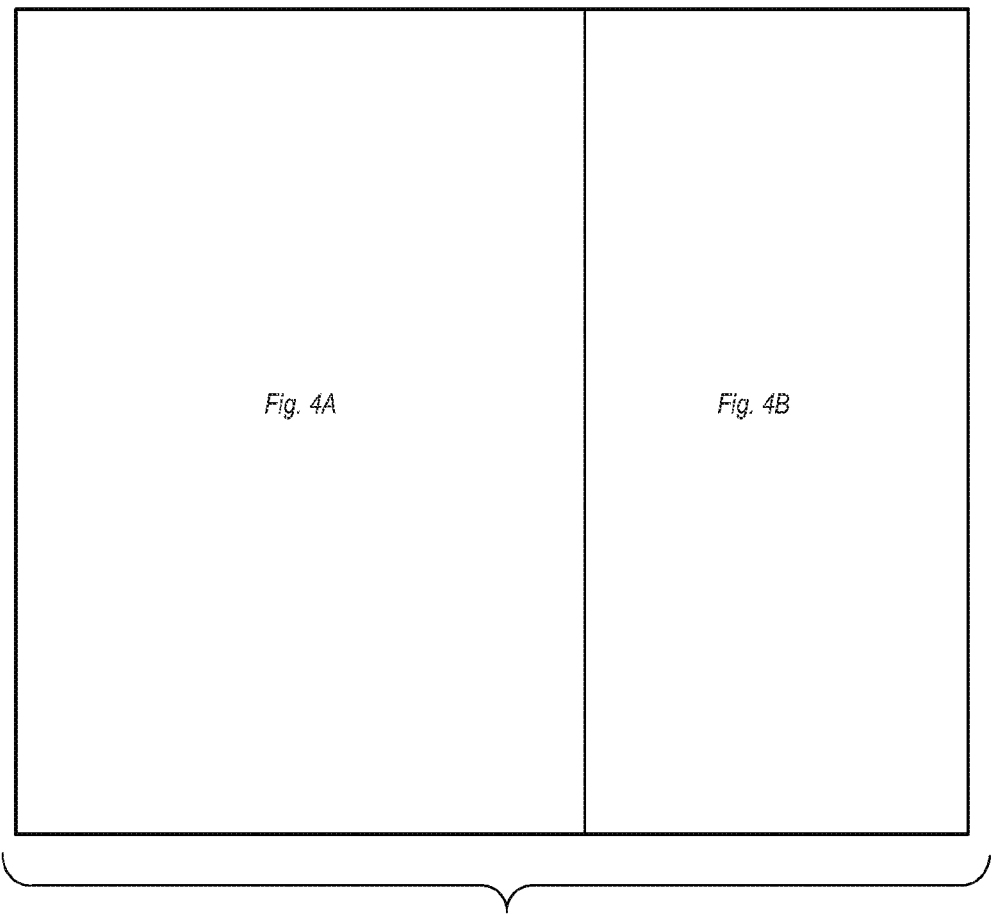
FIG. 4 illustrates an example of billing information.

FIG. 4 illustrates an example of billing information 400 received from a time keeping program. As illustrated, billing information 400 includes jobs 410, job phases 405, task names 420, and task identifiers 430 for the tasks. Billing information 400 also includes time billed 440 for jobs, names of jobs 410, names of tasks 420, names of individuals 450, and/or individual identifiers 455.

As shown in FIG. 3, billing information may be continuously received or received in batches. Billing information may be received periodically, such as nightly, during weekends, or at other off-peak times, or a periodically. For example, billing information may be retrieved for a time period (operation 312). Billing information received may include amounts of time billed for jobs and individual identifiers and job identifiers associated with the amounts of time billed.

The phases of jobs (e.g., preliminary, development, implementation, operation, upgrades, etc.) may be identified (operation 320). A job phase may be identified based at least in part on which types of tasks are included in the billing information. A job phase may be identified based on job identifiers and/or task identifiers. For example, at least a portion (e.g., a series of numbers and/or letters) of the job identifier and/or task identifier may indicate the phase of the job. Job phase information may be identified because the treatment of costs may vary based at least in part on the phase of the job associated with the costs. For example, costs in a preliminary phase of a job may be expensed. As another example, interest costs may be capitalizable costs during the development phase of a job, while not capitalizable during other job phases.

Tasks in each job phase may be identified in the billing information (operation 330). At least a portion of a task identifier may provide information about the task and the jobs with which the tasks are associated to facilitate identification of a job phase for a task.

Billing rates for one or more individuals associated with the jobs in the billing information may be retrieved (operation 340). For example, the billing rates may be stored in a memory coupled (e.g., directly or via one or more network protocols) to the cost analysis device. The billing rates may be correlated to individual identifiers or a portion of the individual identifier (e.g., in a table). For example, an individual identifier may include (e.g., via a portion of the individual identifier) a billing classification that is correlated with a billing rate.

Billing information may be identified that is associated with jobs corresponding to the internal development of software for internal use (operation 350). Billing information that is associated with tasks corresponding to the internal development of software for internal use may also be identified. Because internally developed software for internal use may be classified as an asset and/or capitalizable, accurate identification of jobs and/or tasks that are capitalizable may increase profits for an enterprise. For example, jobs and/or tasks corresponding to the internal development of software for internal use may be identified based on a phase of a job, job identifiers and/or task identifiers. As another example, accounting rules may be applied to billing information to identify billing information associated with jobs corresponding to the internal development of software for internal use.

Employees of the enterprise may also be identified (operation 360). Independent contractors or other parties that work on jobs for the enterprise may also be identified. Employees and/or independent contractors may be identified based at least in part on individual identifiers associated with individuals. Identification of individuals with a predetermined relationship to the enterprise may facilitate application of accounting rules, and thus, facilitate determination of capitalizable costs and/or expenses.

Accounting rules may be applied to billing information (operation 370). For example, accounting rules may be accessed from a database (operation 375) and applied by a cost analysis device to billing information. The database may be directly coupled to the cost analysis device and/or accessible via one or more network protocol (e.g., TCP/IP, Wi-Fi, Wi-Max, FireWire, Bluetooth, etc.). Accounting rules may be applied to the billing information or to the portion of the billing information associated with capitalizable jobs and/or capitalizable tasks (e.g., corresponding to the internal development of software for internal use).

Figure 5:
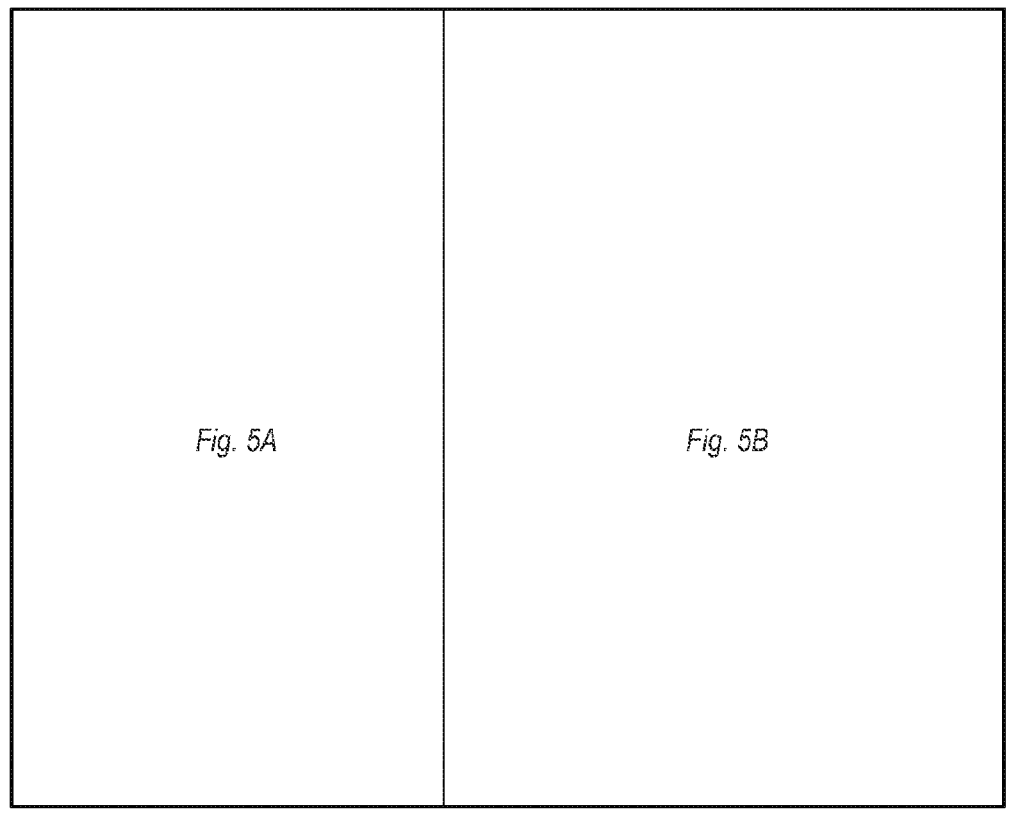
FIG. 5 illustrates another example of billing information.

Accounting rules may, for example, relate to employees, independent contractors, a classification of capitalizable costs, and/or an identification of capitalizable jobs and/or tasks may be applied to billing information. Accounting rules may include a rule related to a relationship of an individual to an enterprise (e.g., an employee or an independent contractor) and/or related to a relationship between an individual and the enterprise. For example, an accounting rule may be related to capitalizable tasks. FIG. 5 illustrates an example of billing information 500. A name or an identifier of a capitalizable task 510 may be identified and costs, such as payroll expenses, associated with the capitalizable task may be characterized as capitalizable. An accounting rule related to capitalizable tasks that is not based on a relationship between an individual and an enterprise may be applied to business information. As illustrated, the name of capitalizable task 510 is "Party Hub Release 1 go live" and the costs are classified as capitalizable costs whether they were billed by employees 520 or independent contractors 530. Another accounting rule may limit the amount of time billed (e.g., 40 hours per week) by employees that can be characterized as capitalizable costs. As illustrated in FIG. 5, this rule is related to the relationship of an individual to an enterprise and thus applicable to employees. Time billed 540 by employee 520 on a capitalizable task 510 is limited to 40 hours per week by this rule while time billed 550 by an independent contractor 530 is not limited by this rule.

As illustrated in FIG. 3, billing information may be modified based on the application of accounting rules to the billing information (operation 380). For example, an accounting rule related to employees may limit an amount of time billed by employees that can be capitalizable to 40 hours per week per employee. Billing information related to an amount of time billed by employees may be modified based on this rule (e.g., 48 hours billed by an employee in a week may be modified to 40 hours). As another example, accounting rules may be related to the identification of jobs for the internal development of software for internal use and the billing information may be modified such that jobs that do not satisfy this rule (e.g., jobs unrelated to internal development of software for internal use) may be hidden or deleted from the billing information.

Capitalizable costs and/or expenses for the enterprise may be determined for a time period (operation 390). For example, capitalizable costs and/or expenses may be determined based on billing rates, the application of accounting rules, and/or the billing information. As another example, capitalizable costs may be determined and expenses may include the other costs in the billing information. Capitalizable costs and/or expenses for the enterprise may be stored and/or transmitted (e.g., to a finance department, to auditors, to government agencies, for remote authenticated storage, etc.).

FIG. 6 illustrates an example display 600 that presents the determined capitalizable costs and expenses for an enterprise. Capitalizable costs 610 and/or expenses 620 may be organized, sorted, and presented based on various categories, such as tasks and/or individual identifiers 630. A total capitalizable cost 640 and/or total expense 650 based on amounts of time billed may be determined and presented.

Process 300 may be implemented by system 100 or similar systems. In addition, various operations may be added, deleted, modified, or reordered in process 300. For example, billing information may be received via XML message. As another example, a job phase may not be identified. In addition, billing rates may not be retrieved. For example, billing information may include billing rates and/or billing information may include costs for amounts of time billed. In addition, employees may not be identified. Furthermore, reports may be generated based on the determined capitalizable costs and expenses. In addition, capitalizable costs and expenses may be determined based on tasks rather than, or in addition to, jobs. For example, tasks corresponding to the internal development of software for internal use may be identified and accounting rules may be applied to the billing information associated with the identified tasks.

Figure 7:
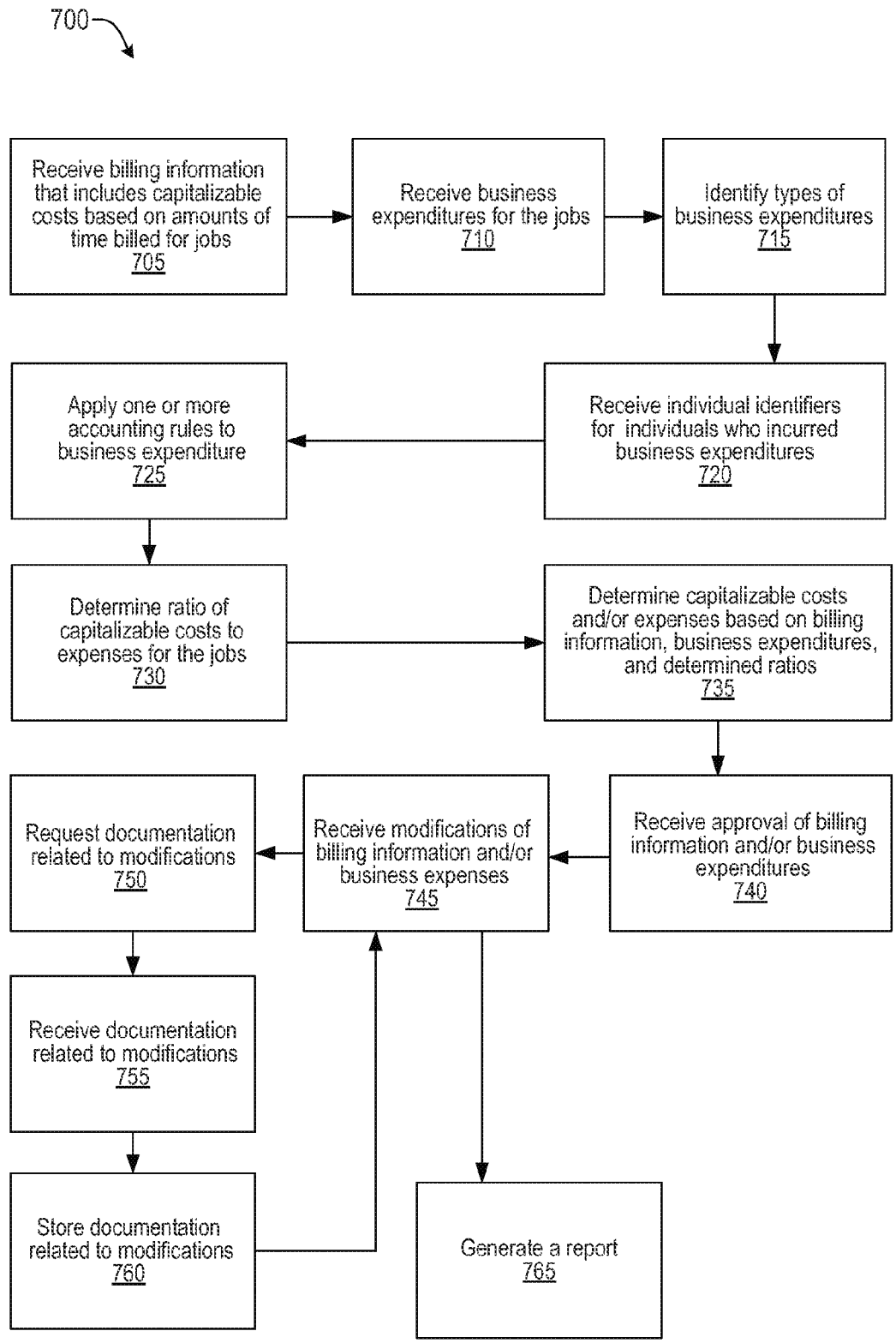
FIG. 7 illustrates a process for determining costs associated with internal development of software.

FIG. 7 illustrates a process 700 for determining capitalizable costs performed by systems, such as system 100 depicted in FIG. 1. Billing information may be received that includes capitalizable costs, which are based on amounts of time billed for jobs (operation 705). Capitalizable costs, which are based on amounts of time billed for jobs, may be determined using processes, such as process 200, process 300, and/or other appropriate processes. Capitalizable costs that are based on amounts of time billed for jobs may be retrieved from a memory coupled (e.g., directly or indirectly) to a cost analysis device. Billing information may be received for a time period (e.g., month, quarter, year, etc.). Billing information may also include individual identifiers, job identifiers, task identifiers, job phases, and/or expenses that are based on amounts of time billed for jobs.

FIG. 8 illustrates an example of received billing information 800. Billing information 800 may include individual identifiers 810 that indicate a name 820 of an individual and/or a relationship 830 of the individual to the enterprise (e.g., employee or independent contractor). As illustrated, billing information 800 includes capitalizable costs 840 and expenses 850. Billing information 800 also includes billing rates 860.

Figure 9:
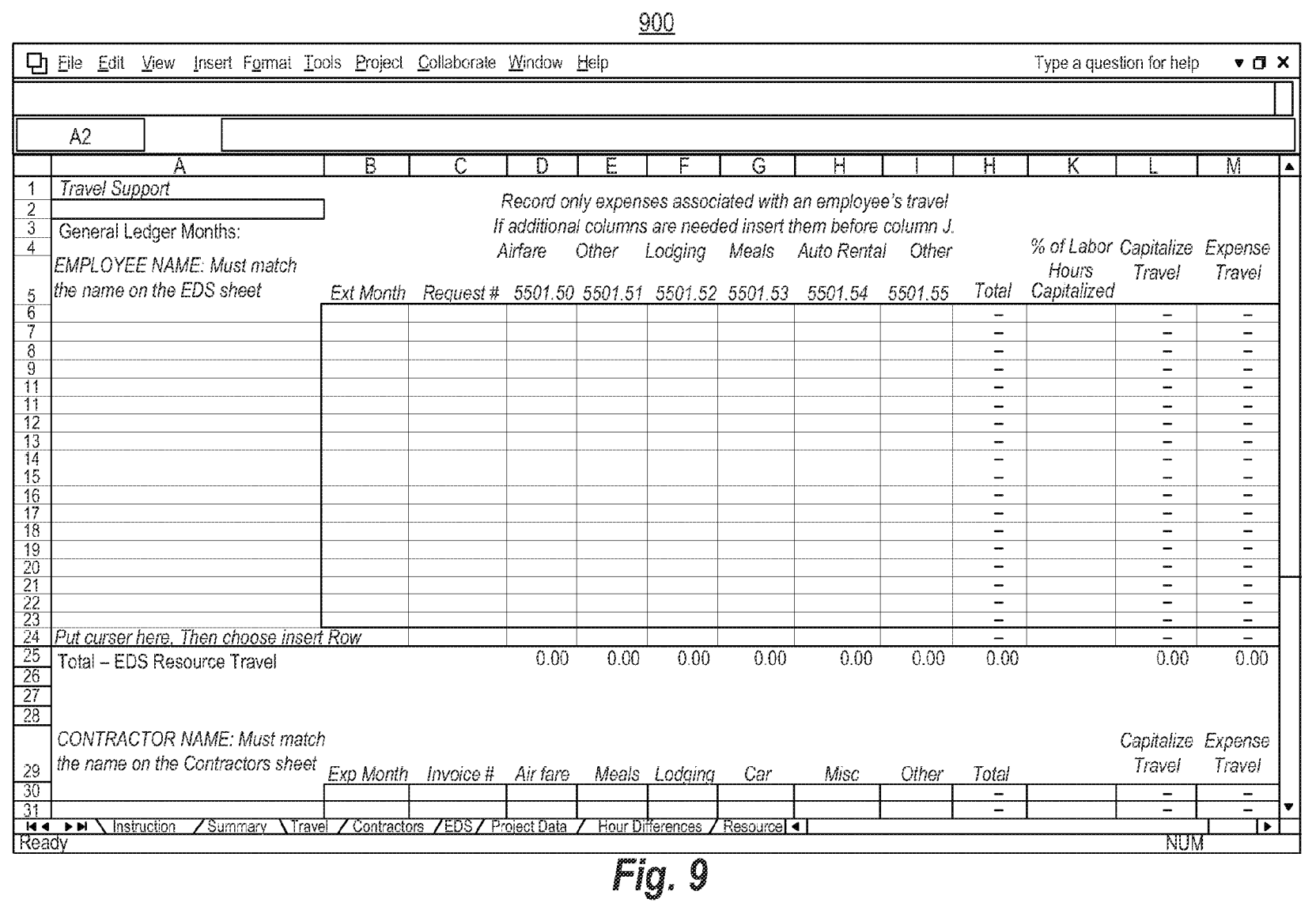

As illustrated in FIG. 7, business expenditures for jobs may be received (operation 710). For example, managers and/or individuals may enter business expenditures via a website coupled to the cost analysis device. FIG. 9 illustrates an example of a display 900 presented to a manager and/or an individual. The display may facilitate entry of business expenditures. Business expenditures may be entered using a display which includes drop-down fields with available options, such as for types of business expenditures. The display may also automatically determine a portion of the fields (e.g., based on business expenditures provided and/or billing information), such as a ratio of capitalizable costs to expenses (illustrated as "% of labor hours capitalized") and/or totals.

The types of business expenditures may be identified (operation 715). For example, types of business expenditures may include travel expenditures (airfare, lodging, auto rental, mileage, etc.), meal expenditures, entertainment expenditures, and/or other expenditures. The type of business expenditures may be received via fields in a display (e.g., display 900). Different types of business expenditures may be treated differently by accounting rules, and thus characterized, differently by government regulations and/or GAAP, for example. Thus, the type of business expenditures may be identified to determine which business expenditures or what portion of business expenditures are appropriately characterized as capitalizable costs or expenses.

Individual identifiers for individuals who incurred the received business expenditures may be received (operation 720). Different accounting rules may apply based on a relationship of the individual to the enterprise (e.g., employees v. independent contractors), and thus individual identifiers may be used to identify whether individuals are employees or independent contractors.

One or more accounting rules may be applied to the business expenditures (operation 725). For example, an accounting rule may relate to capitalizable business expenditures, and as a result of the application of the rule, at least a portion of business expenditures may be capitalizable for independent contractors but expensed for employees.

A ratio of capitalizable costs to expenses may be determined for the jobs in the billing information (operation 730). The ratio of capitalizable costs to expenses may be determined based at least in part on the individual identifiers associated with the business expenditures, amount of time billed to tasks in a job, classification of tasks in a job as capitalizable, job phase, etc. For example, the ratio may be the ratio of capitalizable labor costs to expensed labor costs (e.g., for the period, the job, and/or the task).

Capitalizable costs and/or expenses may be determined based on billing information, business expenditures, and the determined ratios of capitalizable costs to expenses (operation 735). Capitalizable costs and/or expenses may also be determined based on the application of accounting rules to the business expenditures. A total capitalizable cost and/or a total expense for the enterprise may be determined based on determined capitalizable costs, determined expenses, and/or capital costs and/or expenses in the received the billing information. Capitalizable costs and/or expenses may be stored in a memory.

Government regulations and/or other standard accounting procedures (e.g., provided by GAAP, SOP, FASB, etc.) may require approval of billing information and/or business expenditures in order to treat costs associated with the internal development of software for internal use as capitalizable costs. Thus, billing information and/or business expenditures may be displayed to a manager, or other appropriate individual, for approval and/or modification. Approval of billing information and/or business expenditures may be received (operation 740). For example, a manager of employees and/or independent contractors may review and approve or disapprove portions of the billing information and/or business expenditures.

Figure 10:
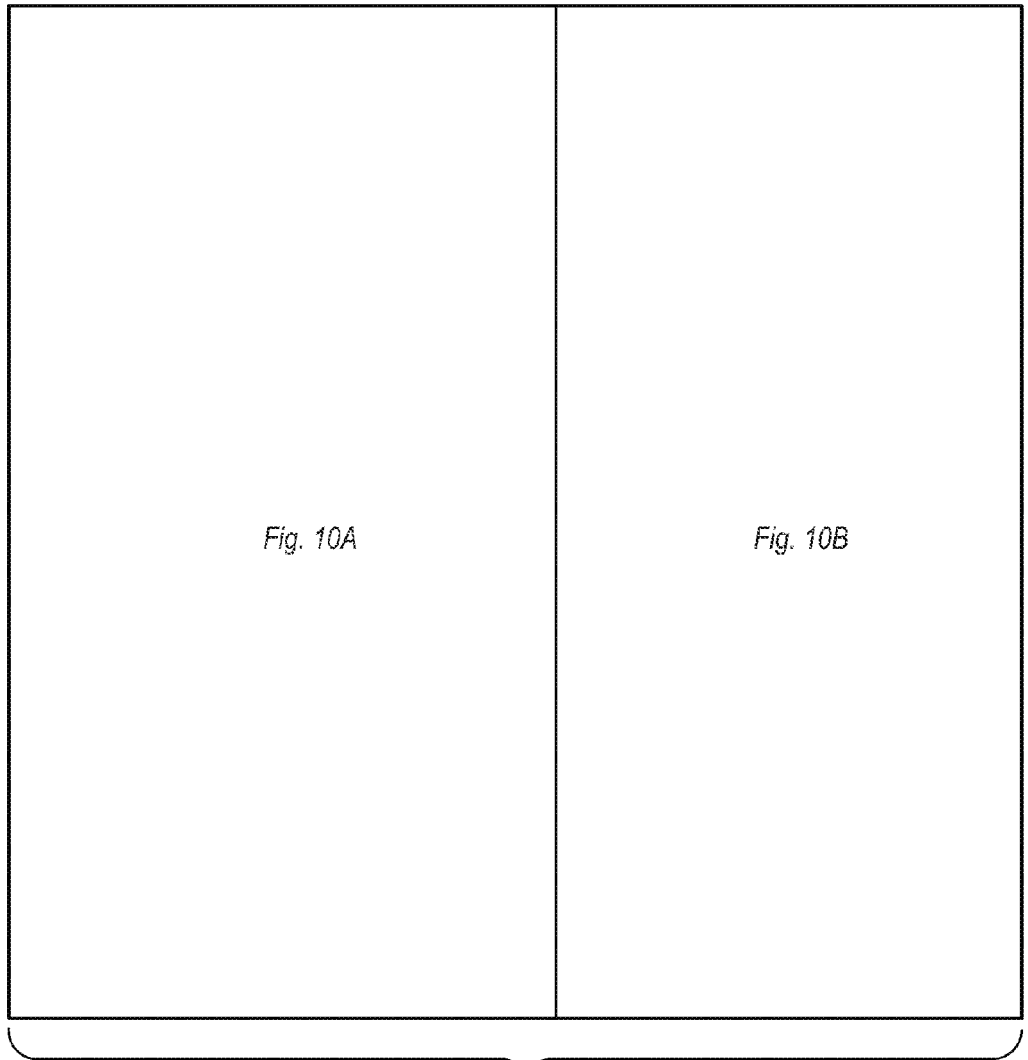
FIG. 10 illustrates an example display presented for review and approval of the billing information and the business expenditures.
Figure 10A:

FIG. 10 illustrates an example of a display 1000 presented to a manager for the manager to provide an indication of approval or disapproval 1010 of billing information 1020 and/or business expenditures. Display 1000 may be presented via a presentation interface of the manager's computer. Display 1000 may have a user interface that facilitates approval (e.g., by allowing sorting by categories, such as employee, task, or job; by allowing querying; and/or by highlighting modifications). Display 1000 may also include invoice amounts 1030 and an indication of whether the invoice amounts are approximately the same as costs from the amounts billed by independent contractors in the billing information and/or business expenditures.

As illustrated in FIG. 7, modifications to billing information and/or business expenditures may be received (operation 745). When a manager reviews billing information and/or business expenditures, the manager may modify portions of billing information and/or business expenditures. Modifications may include altering amounts of time billed, job identifiers, task codes, individual identifiers, business expenditures, etc. Compliance with government regulations and/or standard accounting procedures may require documentation of modifications. Auditors may then verify modifications at a later date.

Documentation related to modifications may be requested (operation 750). For example, when a portion of billing information and/or business expenditures is modified, a message (e.g., on the website, in a separate window, etc.) may be transmitted requesting documentation that verifies the modification. Documentation may include receipts, signed statements, and/or other appropriate documents.

Documentation related to modifications may be received (operation 755) and stored (operation 760). For example, documentation (e.g., images or text, such as pdfs, rich text files, html files, etc.) may be transmitted to the cost analysis device and stored in a memory coupled to the cost analysis device.

Reports may also be generated (operation 765). A generated report may include capitalizable costs and/or expenses. For example, a quarterly report may be generated that includes capitalizable costs and expenses for an enterprise for a quarter. The reports may be saved and/or transmitted (e.g., to a finance department, to government agencies, etc.).

Figure 11:
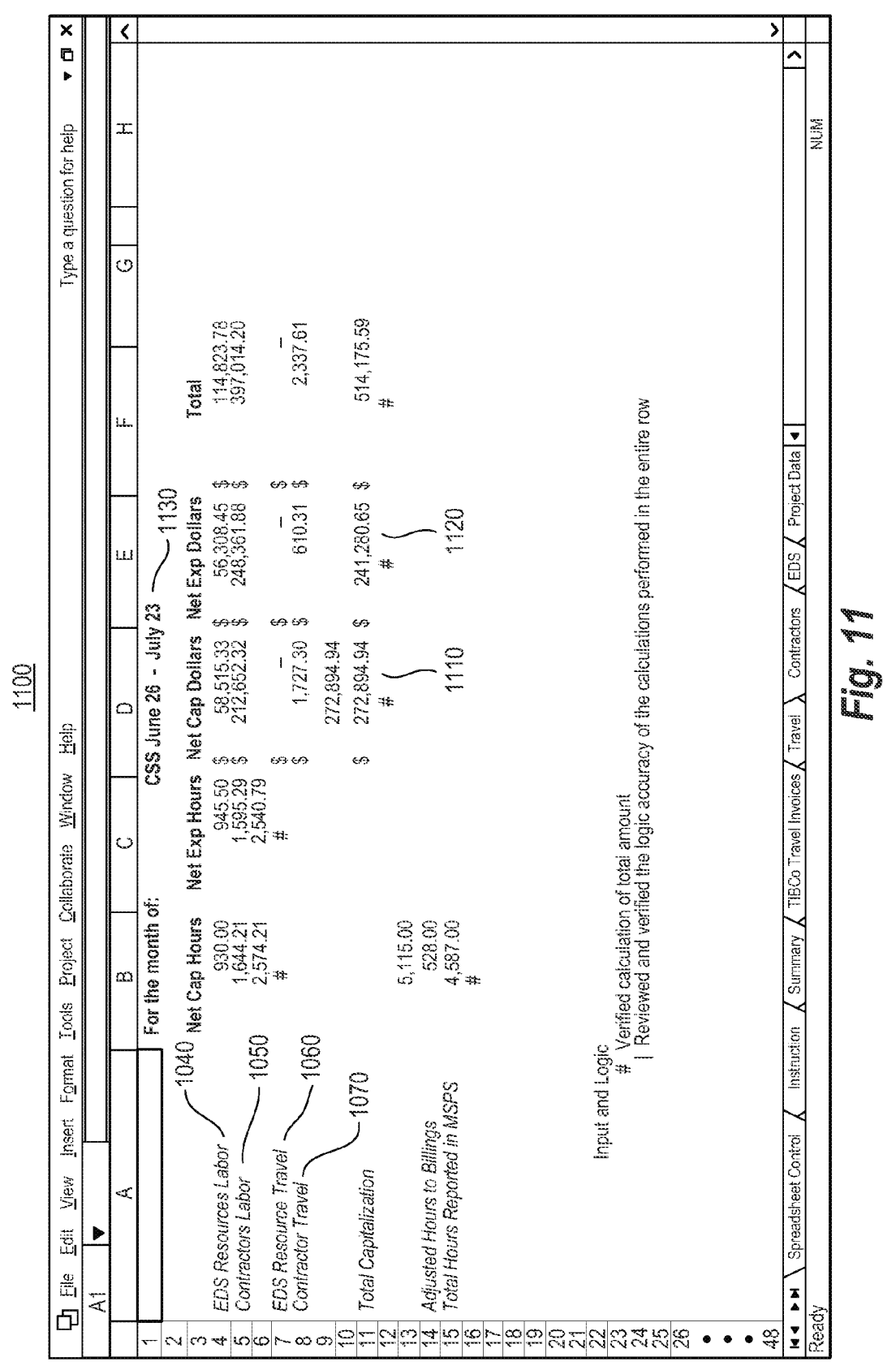

FIG. 11 illustrates an example of a generated report 1100. As illustrated, report 1100 includes capitalizable costs 1110 and expenses 1120 for a time period 1130. The report may summarize capitalizable costs and expenses based on whether the costs and/or expenses are associated with time billed by employees 1140, time billed by independent contractors 1150, business expenditures incurred by employees 1160, and/or business expenditures incurred by independent contractors 1170.

Process 700 may be implemented by system 100 or similar systems. In addition, various operations may be added, deleted, modified, or reordered in process 700. For example, billing information may be received via XML message. As another example, a job phase, capitalizable jobs, and/or capitalizable tasks may be identified. As another example, jobs and/or tasks related to the internal software development for internal use may be identified and business expenditures for the identified jobs and/or tasks may be received. In addition, capitalizable costs and/or expenses may be determined based on tasks, rather than, or in addition, to jobs. For example, billing information and business expenditures received may be associated with tasks. As another example, the ratio of capitalizable costs to expenses may be determined for one or more task in business expenditures.

Although users (e.g., user, manager, employee, independent contractors, and/or other parties) have been described as a human, a user may be a person, a group of people, a person or persons interacting with one or more computers, and/or a computer system. A user computer may describe one or more computers and/or computer systems.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user by an output device can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. Accordingly, other implementations are within the scope of this application.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a cost" includes a combination of two or more costs and reference to "a job" includes different types of jobs.

What is claimed is:

1. A computer-implemented method of determining costs associated with software development for internal use, the method comprising:
   receiving billing information for jobs using a cost analysis device comprising an analysis module, wherein the billing information includes job identifiers for the jobs and capitalizable costs for an enterprise for a time period based on amounts of time billed by individuals for one or more of the jobs;
   receiving business expenditures for one or more of the jobs;
   determining at least one ratio of capitalizable costs to expenses for each of the jobs, the capitalizable costs in the determined at least one ratio comprise the capitalizable costs included in the billing information; and
   determining total capitalizable costs for the enterprise using an expense module of the cost analysis device for the time period based on the billing information, the business expenditures and the determined at least one ratio.

2. The method of claim 1 further comprising receiving identification of business expenditure types for the received business expenditures.

3. The method of claim 1 further comprising performing an analysis of the business expenditures based on one or more accounting rules, wherein at least one of the accounting rules includes a rule applicable to capitalizable portions of the business expenditures.

4. The method of claim 1 wherein determining at least one of the ratios of capitalizable costs to expenses for each of the jobs is based at least in part on the individual identifiers associated with the business expenditures.

5. The method of claim 1 further comprising receiving individual identifiers for individuals associated with the business expenditures, wherein the individual identifiers include a relationship of an individual to the enterprise, and wherein determining total capitalizable costs for the enterprise for the time period is based at least partially on the individual identifiers.

6. The method of claim 5 wherein the billing information includes amounts of time billed to capitalizable tasks of at least one of the jobs, and wherein at least one of the ratios of capitalizable costs to expenses is based in part on the amount of time billed to the capitalizable tasks.

7. The method of claim 1 further comprising receiving approval of the received business expenditures.

8. The method of claim 1 further comprising receiving approval of the received billing information.

9. The method of claim 1 further comprising receiving modifications of the received billing information.

10. The method of claim 9 further comprising:
    receiving documentation related to the received modifications; and
    storing the received documentation.

11. The method of claim 1 further comprising storing the total capitalizable costs for the enterprise for the time period.

12. The method of claim 1 further comprising determining expenses for the enterprise for the time period based on the billing information, the business expenditures, and at least one of the ratios of capitalizable costs to expenses.

13. The method of claim 1 further comprising generating a report including the total capitalizable cost for the enterprise for the time period.

14. An article comprising machine-readable medium storing instructions for determining capitalizable costs associated with software development for internal use, the instructions operable to cause a data processing apparatus to perform operations comprising:
    receiving billing information for jobs using a cost analysis device comprising an analysis module, wherein the jobs include tasks, and wherein the billing information includes task identifiers for the tasks and capitalizable costs for an enterprise for a time period based on amounts of time billed for one or more of the tasks;
    receiving business expenditures for one or more of the tasks;
    receiving individual identifiers for individuals who incurred the business expenditures, wherein the individual identifiers indicate a relationship of an individual to the enterprise;
    determining at least one ratio of capitalizable costs to expenses for at least one of the tasks, the capitalizable costs in the at least one ratio comprise the capitalizable costs included in the billing information; and
    determining total capitalizable costs for the enterprise using an expense module of the cost analysis device for the time period based on the billing information, the business expenditures, the individual identifiers, and the determined at least one ratio.

15. The article of claim 14 wherein the instructions are further operable to cause the data processing apparatus to perform operations comprising performing an analysis of the business expenditures based on one or more accounting rules, and wherein at least one of the accounting rules includes a rule related to capitalizable portions of the business expenditures.

16. The article of claim 14 wherein the at least one ratio is based on the time billed by the individuals to at least one of the tasks.

17. The article of claim 14 wherein the instructions are further operable to cause the data processing apparatus to perform operations comprising receiving approval of the received business expenditures.

18. The article of claim 14 wherein the instructions are further operable to cause the data processing apparatus to perform operations comprising receiving modifications of the received business expenditures and documentation related to the received modifications.

19. A system for determining capitalizable costs associated with development of software for internal use, the system comprising:
   a memory storing one or more accounting rules;
   an analysis module adapted to:
      receive billing information for jobs, wherein the billing information includes capitalizable costs for an enterprise for a time period based on amounts of time billed by individuals and individual identifiers associated the individuals;
      receive business expenditures associated with one or more of the individuals; and
      determine ratios of capitalizable costs to expenses for the jobs, the capitalizable costs in the determined ratios comprise the capitalizable costs included in the billing information; and
   an expense module adapted to determine total capitalizable costs for the enterprise for the time period based on the billing information, the business expenditures, and the determined ratios.

20. The system of claim 19 further comprising a rules engine adapted to performing an analysis of the business expenditures based on one or more accounting rules, and wherein at least one of the accounting rules includes a rule applicable to an independent contractor of the enterprise, wherein the independent contractor is identified based on the individual identifiers.

\* \* \* \* \*